Figure 1:
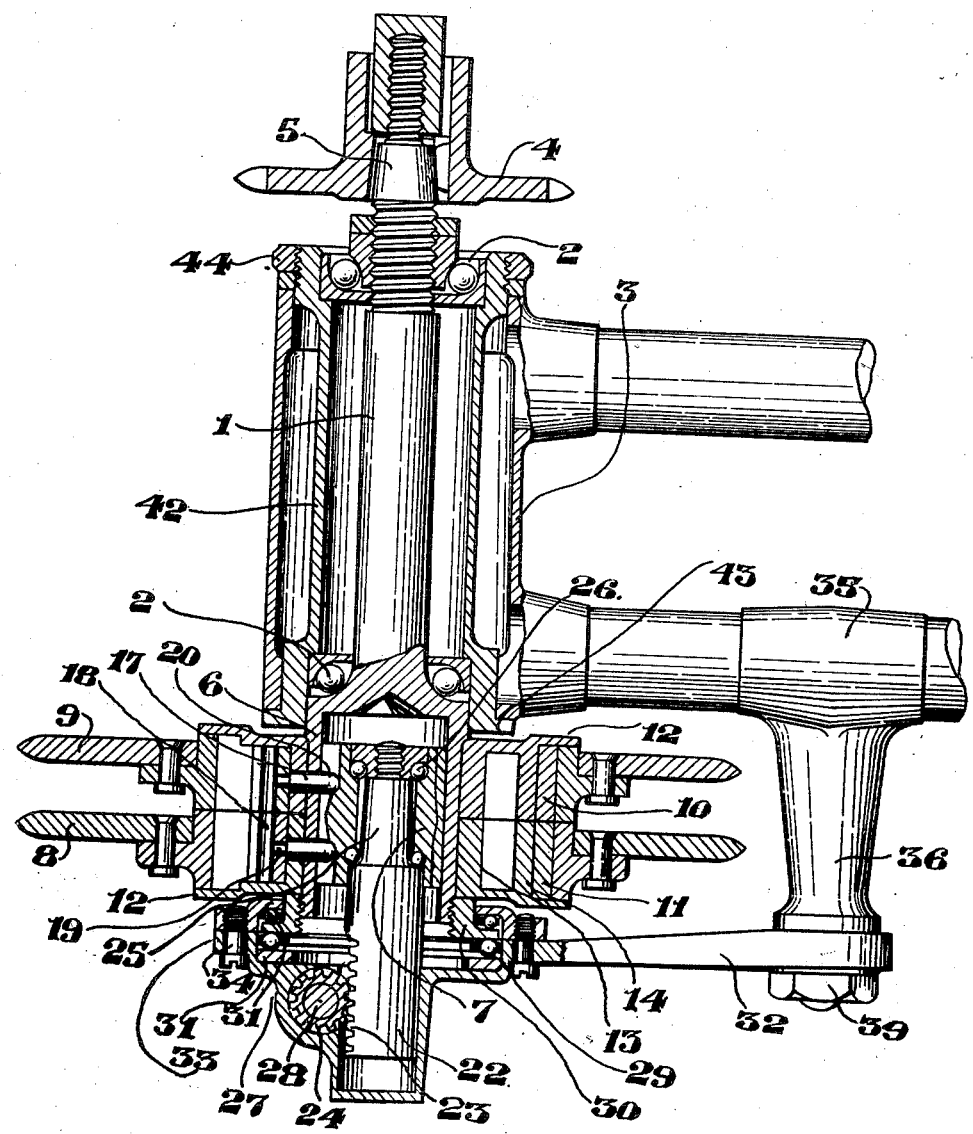

F. W. SMITH.
VARIABLE SPEED GEARING FOR MOTOR CYCLES.
APPLICATION FILED JUNE 17, 1911.

1,032,245.

Patented July 9, 1912.

2 SHEETS—SHEET 1.

F. W. SMITH.
VARIABLE SPEED GEARING FOR MOTORCYCLES.
APPLICATION FILED JUNE 17, 1911.
1,032,245.
Patented July 9, 1912.
2 SHEETS—SHEET 2.
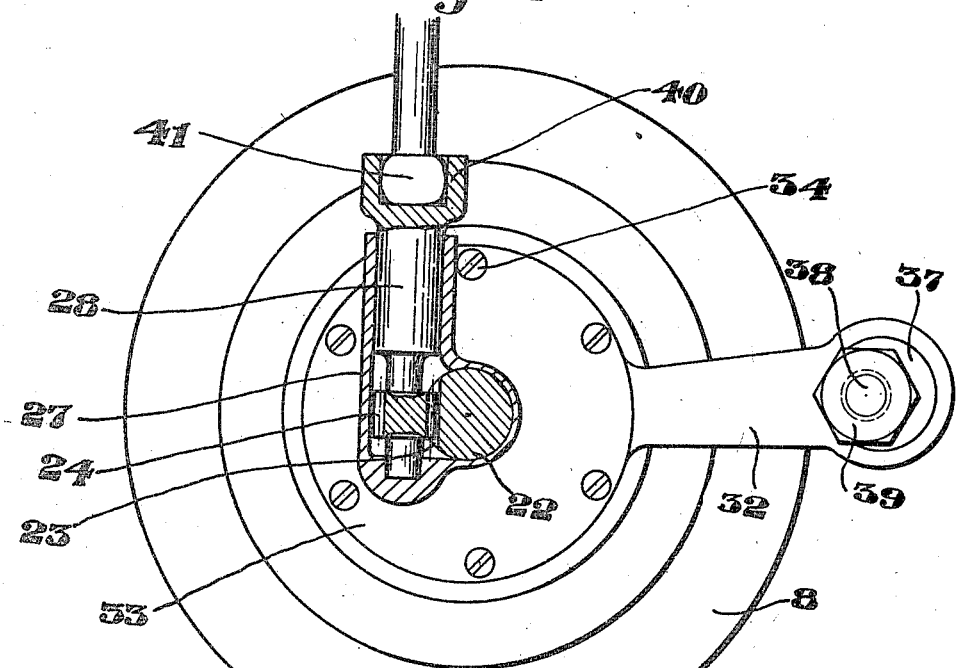
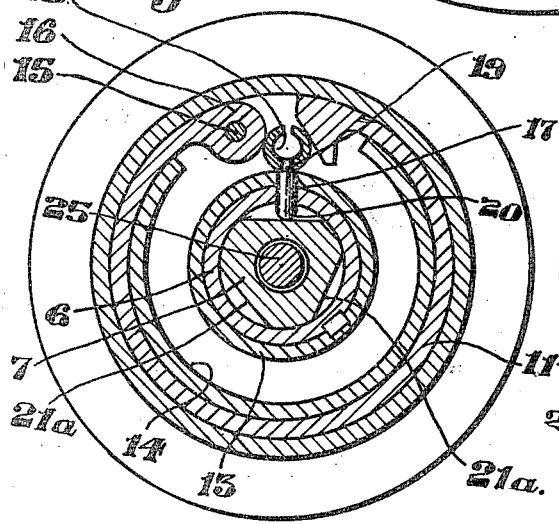
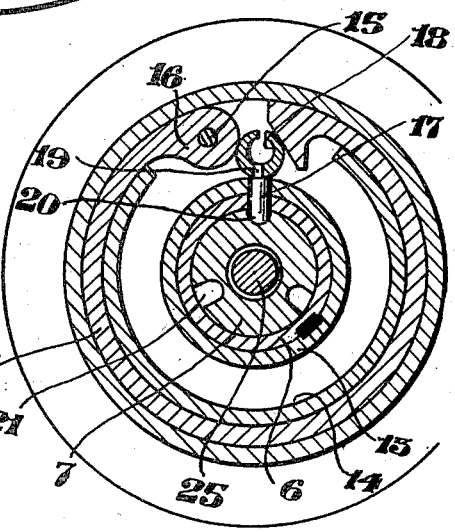

UNITED STATES PATENT OFFICE.

FRANK WALKER SMITH, OF REDDITCH, ENGLAND.

VARIABLE-SPEED GEARING FOR MOTOR-CYCLES.

1,032,245.   Specification of Letters Patent.   Patented July 9, 1912.

Application filed June 17, 1911. Serial No. 633,811.

*To all whom it may concern:*

Be it known that I, FRANK WALKER SMITH, a subject of the Kingdom of Great Britain, residing at the Enfield Works, Redditch, in the county of Worcester, England, have invented certain new and useful Improvements in or Relating to Clutch Mechanism and Variable - Speed Gearing for Motor-Cycles, of which the following is a specification.

This invention comprises improvements in or relating to clutch mechanism and variable speed gearing for use on motor cycles, tri-cars and other motor vehicles, and it has for its purpose the provision of a clutch and speed gear mechanism which is simple in construction, relatively inexpensive to manufacture, and efficient in operation.

According to the present invention, a revolving shaft is provided with driving and driven members arranged to connect the rear wheel of the machine with the engine shaft, by means of transmission agents, two or more of the said members being arranged at one part of the revolving shaft and having friction clutches by which they may be selectively coupled to their shaft for bringing the various gear ratios into operation. When the clutches are free, a free engine position is provided. Advantageously two adjacent members are arranged at or near one end and a single member at or near the other extremity of the shaft, such members being sprocket wheels in the case of chain transmission; by such an arrangement the driving and driven members can be placed on opposite sides of the machine so that it is possible to use a narrower chain line than if all the chains were on one side. Friction clutches having internal expanding rings operated by a common member are advantageously employed, the operating mechanism being arranged at that end of the countershaft at which the clutches are disposed, thus enabling the revolving shaft to be a solid one. By virtue of the outside arrangement of the operating gear, a certain amount of end thrust is set up momentarily when the clutches are being engaged or released and a convenient means of accommodating the said thrust takes the form of a bearing supported on an arm fixed to the frame.

In order that this invention may be clearly understood and more readily carried into practice, reference may be had to the appended two sheets of drawings, upon which:—

Figure 1 is a sectional plan of apparatus according to the invention. Fig. 2 is an elevation of the gear shown in Fig. 1. Fig. 3 is a sectional elevation through one of the clutches and operating mechanism. Fig. 4 is a sectional view of a detail hereinafter described.

In carrying the invention into effect as applied to a motor cycle or tri-car, the countershaft 1 is arranged at a suitable point on the frame and is journaled on ball bearings 2 supported by a bracket conveniently forming part of the frame such as the bottom bracket 3. When the gear is to be employed with chain transmission, a suitably-dimensioned sprocket wheel 4 may be secured on the one extremity 5 of the countershaft and connected by a chain to the rear wheel, the opposite extremity 6 of said counter-shaft being enlarged beyond the supporting ball bearing and bored out to accommodate an axially-moving operating member 7 adapted to bring the clutches into or out of engagement with their sprockets 8, 9 which latter may be driven from the engine.

For transmitting the drive from the enlarged extremity of the countershaft to the driven sprocket wheels concentric therewith, internally expansible rings 10, 11 are employed, said rings being housed in the bosses of the driven sprocket wheels. Keyed to or otherwise rigidly connected to the enlarged extremity of the countershaft are two adjacent disks 12 having two annuli extending sidewise in such a manner that the inner annulus 13 fits on the periphery of the enlarged countershaft extremity while the expansible rings 10, 11 surround and are supported by the outer annulus 14 which is conveniently cut away for a portion of its periphery to accommodate the means for expanding the rings. To transmit the power from the expansible rings to the disk, a stud, boss, projection or the like is formed on one or the other, such as a pin 15 on the disk 12 to engage with a corresponding recess or hole in an eye 16 on the other part.

The means for expanding the rings may conveniently comprise a short stud or spindle 17 passing through from the bore of the enlarged countershaft extremity to engage the inner part of the rings, short cylindrical split members or sleeves 18 being interposed between the ring and the stud for the purpose of insuring a gradual engagement, when the clutch is engaged. The part of the expansible ring which engages the short sleeve may be of V-configuration, the surrounding portions being correspondingly shaped to suit, while the stud 17 connecting the sliding member with the short sleeve 18 may be reduced in diameter at its outer part 19 and suitably rounded off at its inner part 20. The sleeves may be eccentric in cross section to increase their resiliency, with the slit at the thinnest part.

To effect radial displacement of the studs necessary to expand the clutch rings, a body 7 conveniently of faceted or cylindrical form is arranged in the hollow end of the countershaft concentrically with the driven sprocket wheels and is provided with a plurality such as three of longitudinal grooves 21 see Fig. 4, depressions, or facets 21$^a$ see Fig. 3 of a cam-like configuration so arranged in relation to the two studs that in the middle position both studs are in the inward position as shown in Fig. 1, while when the cam body is moved outwardly, the top stud is operated and the corresponding clutch ring expanded or vice versa, thus giving a free engine in conjunction with the two speeds. By forming the facets or grooves of different depths, wear is very readily taken up as it is only necessary to move the cam body and replace it in position with the studs engaging a fresh facet or groove which being shallower than the one previously in use takes up slackness which would otherwise accrue. Any suitable number of facets or grooves may be employed, and it will be readily understood that by making such provision the life of the parts is considerably enhanced.

The operating cam 7 is formed to an annulus in order to accommodate a short non-rotatable operating spindle 22 which spindle is moved inward in the preferred manner by means of a rack 23 and pinion 24 the rack teeth being formed in the outer extremity of the said spindle 22, while its inner portion 25 projects into the enlarged countershaft end 6 to engage with the cam and for this purpose is furnished with suitable anti-friction or thrust bearings 26. A housing 27 journally supports the vertical shaft 28 on which the toothed pinion 24 is carried and conveniently the said housing may also support the non-rotatable spindle 22 at that part at which the teeth are formed. In lieu of the rack and pinion any other suitable means may be employed for operating the cam body.

To prevent as far as possible any strain on the countershaft from taking place when the clutch is being operated, an outer bearing may be incorporated and may conveniently take the form of a double thrust ball bearing 29, an annular disk 30 being screwed onto the enlarged extremity of the countershaft while annular ball races 31 one on each side of the said cone are conveniently attached from the arm 32 which is rigidly mounted on the frame of the machine. Conveniently the said arm is extended to constitute the bearings or housing for the non-rotatable spindle and its appurtenant pinion, the outer ball race being positioned in the inner face of the boss 33 or enlarged part of the arm, while the inner ball race is secured to the said arm by screws 34 and encircles the cone, the whole being so combined as to inclose the entire operating mechanism and thereby preclude the exudation of oil or ingress of dust. The said stiffening arm effectually supports the countershaft and enables it to satisfactorily transmit power to the back wheel, a suitable anchorage for the rigid extremity of the arm being formed by a bracket or lug 35 with extending arm 36 brazed or otherwise secured to a part of the frame close to the bottom bracket. For facilitating adjustment of the arm in the process of manufacture, the rigid extremity may be coupled to the bracket arm 36 by an eccentric connection comprising a sleeve 37 pin 38 and locking nut 39 which allows the distance between the centers of the arm 36 and the clutches to be adjusted to a high degree of accuracy to suit the particular machine to which it is applied.

The vertical shaft 28 aforementioned for rotating the toothed pinion in the process of operating the gear may be connected by a universal joint to the shaft leading to the control shaft so that the control lever may be placed in a plane different from that occupied by the toothed pinion and yet transmit movement satisfactorily thereto. A convenient form of universal joint consists in forming in the said vertical shaft 28 a hole or recess 40 of square or other appropriate shape with which a member 41 square in section, on the bottom of the control rod, is adapted to engage. To allow however of the required universal movement, the engaging faces of the square section member are not flat planes as are those of the hole but are of a convex or partly spherical contour so that while effecting the transmission of movement in a satisfactory manner, the universal action is in no way impeded.

Conveniently the ball bearings of the countershaft are carried in a sleeve 42 which sleeve has a head 43 at one extremity and is adapted to receive a nut 44 at the other, thereby allowing the entire gear to be passed into the bracket provided for its reception, as a self-contained unit, the screwing up of the nut being all that is necessary to then retain the gear in position. By suitably increasing the number of transmission agents and clutches it will be readily understood that three or more speeds could be accommodated while it will be obvious that a belt transmission could if desired be readily adopted in place of or in conjunction with chain. It will further be understood that the two adjacent members having the clutches may be connected by transmission agents either to the engine or to the rear wheel, the third sprocket being in the one case coupled to the back wheel while in the other it is connected to the motor. In the embodiment shown, the adjacent members are of equal diameter and different sized wheels are employed on the engine shaft or on the rear wheel hub as the case may be but it will be obvious that the adjacent members could be of different diameters in which case the corresponding engine or road wheel members would be suitably dimensioned to correspond with the required gear ratios.

What I claim as my invention and desire to secure by Letters Patent is:—

1. In a clutch and variable speed gearing for motorcycles or like motor vehicles, the combination with a frame, of a solid shaft mounted therein and having a hollow portion, ring or wheel bearing members fixed to said shaft, adjacent wheels rotatable on said members, friction elements for frictionally coupling said wheels with said members, a longitudinally and axially movable cam in said hollow portion, and devices actuated upon movement of said cam for operating said elements to frictionally couple either of said wheels with said bearing members, substantially as described.

2. In a clutch and variable speed gearing for motorcycles or like motor vehicles, the combination with a frame, of a shaft mounted therein and having a hollow portion, adjacent wheels rotatable about said shaft near one end, a driven wheel on said shaft at the other end thereof, friction elements connected with said shaft for frictionally coupling said adjacent wheels thereto, a longitudinally movable cam in said hollow portion, and devices actuated upon movement of said cam for operating said friction element to couple either of said wheels with said shaft, substantially as described.

3. In a clutch and variable speed gearing for motorcycles or like motor vehicles, the combination with a frame, of a shaft mounted therein and having a hollow portion, wheel bearing members fixed to said shaft, adjacent wheels rotatable on said members, friction elements connected with said members for frictionally coupling said wheels therewith, devices for actuating said elements to throw said wheels into coupling relation with said members, and a cam having cam faces of different depth for adjustment to actuate said devices, substantially as described.

4. In a clutch and variable speed gearing for motorcycles or like motor vehicles, the combination with a frame, of a shaft mounted therein and having a hollow portion, wheel bearing members fixed to said shaft, wheels rotatable on said members, friction elements connected with said members for frictionally coupling said wheels thereto, a longitudinally movable cam in said hollow portion, and devices adapted for engagement with said cam and having yielding portions engaging said friction elements for actuating the same, substantially as described.

5. A clutch and variable speed gearing for motorcycles or like motor vehicles, the combination with a frame, of a shaft mounted therein, adjacent wheels rotatable about said shaft, friction elements connected with said shaft for coupling either of said wheels therewith, studs having yielding elements for engaging said friction elements to expand the same, and a cam for actuating said studs, substantially as described.

6. In a clutch and variable speed gearing for motorcycles or like motor vehicles, a frame, a shaft mounted therein, wheel bearing members connected with said shaft and having split rigid rings, a wheel loosely disposed on each member, expansible split friction elements embracing said rings, and means extending through the divided portions of said rings for expanding said elements, substantially as described.

In witness whereof I have hereunto set my hand in the presence of two witnesses this 15th May 1911.

FRANK WALKER SMITH.

Witnesses:
T. C. PALIHELT,
T. E. LEARD.